(12) United States Patent
Lisseman et al.

(10) Patent No.: US 10,180,723 B2
(45) Date of Patent: Jan. 15, 2019

(54) FORCE SENSOR WITH HAPTIC FEEDBACK

(71) Applicant: TK Holdings, Inc., Auburn Hills, MI (US)

(72) Inventors: Jason Lisseman, Shelby Township, MI (US); David Andrews, Ortonville, MI (US)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 0 days.

(21) Appl. No.: 14/509,332

(22) Filed: Oct. 8, 2014

(65) Prior Publication Data
US 2015/0097791 A1    Apr. 9, 2015

Related U.S. Application Data

(60) Provisional application No. 61/891,231, filed on Oct. 15, 2013, provisional application No. 61/888,322, filed on Oct. 8, 2013.

(51) Int. Cl.
*G06F 3/16*    (2006.01)
*G06F 3/01*    (2006.01)
(Continued)

(52) U.S. Cl.
CPC ............. *G06F 3/016* (2013.01); *B62D 1/04* (2013.01); *G06F 3/0414* (2013.01);
(Continued)

(58) Field of Classification Search
CPC ...... G06F 3/016; G06F 3/0418; G06F 3/0414; G06F 3/167; G06F 2203/04106; G06F 2203/04104; B62D 1/04
See application file for complete search history.

(56) References Cited

U.S. PATENT DOCUMENTS 4,484,026 A    11/1984    Thornburg
4,540,979 A     9/1985    Gerger et al.
(Continued)

FOREIGN PATENT DOCUMENTS

EP    1607850 A2    12/2005
JP    06-037056 U     5/1994
(Continued)

OTHER PUBLICATIONS

International Search Report and Written Opinion issued in related International Application No. PCT/US2014/059652 dated Dec. 22, 2014.
(Continued)

*Primary Examiner* — Mihir K Rayan
(74) *Attorney, Agent, or Firm* — Meunier Carlin & Curfman LLC

(57) ABSTRACT

A system and method for setting threshold values based on an amount and selecting a haptic feedback response. The method comprises determining a touch value based on a touch applied to a touch-sensitive sensor. The method further comprises determining an amount that the touch value exceeds a first threshold value. The method further comprises setting a second threshold value based, at least in part on the amount. The method further comprising selecting a haptic feedback response that can be based at least in part on the amount.

23 Claims, 11 Drawing Sheets

(51) Int. Cl.
  *B62D 1/04* (2006.01)
  *G06F 3/041* (2006.01)
(52) U.S. Cl.
  CPC ............ *G06F 3/0418* (2013.01); *G06F 3/167* (2013.01); *G06F 2203/04104* (2013.01); *G06F 2203/04106* (2013.01)

(56) References Cited

U.S. PATENT DOCUMENTS

| | | |
|---|---|---|
| 4,801,771 A | 1/1989 | Mizuguchi et al. |
| 4,929,934 A | 5/1990 | Ueda et al. |
| 5,398,962 A | 3/1995 | Kropp |
| 5,408,873 A | 4/1995 | Schmidt et al. |
| 5,423,569 A | 6/1995 | Reighard et al. |
| 5,453,941 A | 9/1995 | Yoshikawa |
| 5,463,258 A | 10/1995 | Filion et al. |
| 5,539,259 A | 7/1996 | Filion et al. |
| 5,793,297 A | 8/1998 | Takeuchi et al. |
| 5,855,144 A * | 1/1999 | Parada .................. B60K 37/06 200/61.54 |
| 5,871,063 A | 2/1999 | Young |
| 5,914,658 A | 6/1999 | Arakawa |
| 5,943,044 A | 8/1999 | Martinelli |
| 5,965,952 A | 10/1999 | Podoloff et al. |
| 6,067,077 A | 5/2000 | Martin |
| 6,333,736 B1 | 12/2001 | Sandbach |
| 6,378,384 B1 | 4/2002 | Atkinson et al. |
| 6,429,846 B2 | 8/2002 | Rosenberg et al. |
| 6,501,463 B1 | 12/2002 | Dahley et al. |
| 6,636,197 B1 | 10/2003 | Goldberg et al. |
| 6,809,462 B2 | 10/2004 | Pelrine et al. |
| 6,906,700 B1 | 6/2005 | Armstrong |
| 6,933,920 B2 | 8/2005 | Lacroix et al. |
| 7,126,583 B1 | 10/2006 | Breed |
| 7,136,051 B2 | 11/2006 | Hein et al. |
| 7,258,026 B2 | 8/2007 | Papakostas et al. |
| 7,649,278 B2 | 1/2010 | Yoshida et al. |
| 8,203,454 B2 | 6/2012 | Knight et al. |
| 8,214,105 B2 | 7/2012 | Daly et al. |
| 8,222,799 B2 | 7/2012 | Polyakov et al. |
| 8,237,324 B2 | 8/2012 | Pei et al. |
| 8,269,731 B2 | 9/2012 | Molne |
| 8,633,916 B2 | 1/2014 | Bernstein |
| 8,698,764 B2 | 4/2014 | Karakotsios et al. |
| 9,244,562 B1 | 1/2016 | Rosenberg |
| 9,337,832 B2 * | 5/2016 | Buttolo ................ H03K 17/955 |
| 9,690,380 B2 | 6/2017 | Monkhouse et al. |
| 9,864,507 B2 * | 1/2018 | Cheng .................. G06F 3/04883 |
| 2002/0054060 A1 | 5/2002 | Schena |
| 2003/0043014 A1 | 3/2003 | Nakazawa et al. |
| 2003/0076968 A1 | 4/2003 | Rast |
| 2003/0083131 A1 | 5/2003 | Armstrong |
| 2003/0206162 A1 * | 11/2003 | Roberts ................ G06F 3/0414 345/173 |
| 2004/0021643 A1 * | 2/2004 | Hoshino .................. G06F 3/016 345/173 |
| 2004/0195031 A1 | 10/2004 | Nagasaka |
| 2005/0021190 A1 * | 1/2005 | Worrell .................. B60K 35/00 701/1 |
| 2005/0052426 A1 | 3/2005 | Hagermoser et al. |
| 2005/0063757 A1 * | 3/2005 | Sugimura ............ G06F 1/1626 400/472 |
| 2005/0067889 A1 | 3/2005 | Chernoff |
| 2005/0110769 A1 | 5/2005 | DaCosta et al. |
| 2005/0156892 A1 * | 7/2005 | Grant ...................... G06F 3/016 345/167 |
| 2005/0273218 A1 | 12/2005 | Breed et al. |
| 2006/0025897 A1 | 2/2006 | Shostak et al. |
| 2006/0054479 A1 | 3/2006 | Iisaka |
| 2006/0076855 A1 | 4/2006 | Eriksen et al. |
| 2006/0109256 A1 | 5/2006 | Grant |
| 2006/0113880 A1 | 6/2006 | Pei et al. |
| 2006/0177212 A1 | 8/2006 | Lamborghini et al. |
| 2006/0248478 A1 | 11/2006 | Liau |
| 2006/0262103 A1 | 11/2006 | Hu |
| 2006/0284839 A1 | 12/2006 | Breed |
| 2007/0062753 A1 | 3/2007 | Yoshida et al. |
| 2007/0097073 A1 * | 5/2007 | Takashima ............. G06F 3/016 345/156 |
| 2007/0100523 A1 | 5/2007 | Trachte |
| 2007/0129046 A1 * | 6/2007 | Soh .......................... H04M 1/23 455/403 |
| 2007/0287494 A1 * | 12/2007 | You ........................ H04M 1/23 455/550.1 |
| 2008/0012837 A1 | 1/2008 | Marriott et al. |
| 2008/0062145 A1 | 3/2008 | Shahoian |
| 2008/0079604 A1 | 4/2008 | Madonna et al. |
| 2008/0150911 A1 | 6/2008 | Harrison |
| 2008/0202912 A1 | 8/2008 | Boddie et al. |
| 2008/0264183 A1 | 10/2008 | Graham et al. |
| 2008/0289887 A1 | 11/2008 | Flint et al. |
| 2009/0001855 A1 | 1/2009 | Lipton |
| 2009/0020343 A1 * | 1/2009 | Rothkopf ............. H03K 17/955 178/18.05 |
| 2009/0125811 A1 | 5/2009 | Bethurum |
| 2009/0140994 A1 | 6/2009 | Tanaka et al. |
| 2009/0140996 A1 | 6/2009 | Takashima et al. |
| 2009/0151447 A1 | 6/2009 | Jin et al. |
| 2009/0153340 A1 * | 6/2009 | Pinder ...................... H04B 1/44 340/665 |
| 2009/0160529 A1 | 6/2009 | Lamborghini |
| 2009/0189749 A1 | 7/2009 | Salada |
| 2009/0228791 A1 | 9/2009 | Kim et al. |
| 2009/0237374 A1 * | 9/2009 | Li .......................... G06F 3/0414 345/174 |
| 2009/0241378 A1 | 10/2009 | Ellis |
| 2010/0001974 A1 | 1/2010 | Su et al. |
| 2010/0045612 A1 | 2/2010 | Molne |
| 2010/0053087 A1 | 3/2010 | Dai |
| 2010/0066512 A1 | 3/2010 | Rank |
| 2010/0141606 A1 | 6/2010 | Bae |
| 2010/0168998 A1 | 7/2010 | Matsunaga |
| 2010/0200375 A1 | 8/2010 | Han et al. |
| 2010/0226075 A1 | 9/2010 | Jahge |
| 2010/0236911 A1 | 9/2010 | Wild et al. |
| 2010/0250066 A1 | 9/2010 | Eckstein et al. |
| 2010/0250071 A1 | 9/2010 | Pala et al. |
| 2010/0268426 A1 | 10/2010 | Pathak |
| 2010/0302177 A1 | 12/2010 | Kim et al. |
| 2010/0315267 A1 | 12/2010 | Chung et al. |
| 2010/0321335 A1 | 12/2010 | Seong-Taek et al. |
| 2010/0328112 A1 * | 12/2010 | Liu ........................ G06F 3/0233 341/24 |
| 2011/0037721 A1 | 2/2011 | Cranfill et al. |
| 2011/0046788 A1 | 2/2011 | Daly et al. |
| 2011/0054359 A1 | 3/2011 | Sazonov et al. |
| 2011/0069021 A1 | 3/2011 | Hill |
| 2011/0109552 A1 | 5/2011 | Yasutake |
| 2011/0141052 A1 | 6/2011 | Bernstein et al. |
| 2011/0148608 A1 | 6/2011 | Grant |
| 2011/0175844 A1 | 7/2011 | Berggren |
| 2011/0205081 A1 | 8/2011 | Chen |
| 2011/0210926 A1 | 9/2011 | Pasquero et al. |
| 2011/0216015 A1 | 9/2011 | Edwards |
| 2011/0227872 A1 | 9/2011 | Huska |
| 2011/0241850 A1 | 10/2011 | Bosch et al. |
| 2011/0245992 A1 | 10/2011 | Stahlin et al. |
| 2011/0248728 A1 | 10/2011 | Maruyama |
| 2011/0255023 A1 | 10/2011 | Doyle et al. |
| 2011/0260983 A1 | 10/2011 | Pertuit et al. |
| 2011/0267181 A1 | 11/2011 | Kildal |
| 2011/0279380 A1 * | 11/2011 | Weber ..................... G06F 3/016 345/173 |
| 2011/0290038 A1 | 12/2011 | Hoshino et al. |
| 2012/0013573 A1 | 1/2012 | Liu et al. |
| 2012/0038468 A1 | 2/2012 | Provancher |
| 2012/0039494 A1 | 2/2012 | Ellis |
| 2012/0105367 A1 | 5/2012 | Son et al. |
| 2012/0126959 A1 | 5/2012 | Zarrabi et al. |
| 2012/0127115 A1 | 5/2012 | Gannon |
| 2012/0169663 A1 | 7/2012 | Kim et al. |
| 2012/0223900 A1 | 9/2012 | Jiyama |

(56) References Cited

U.S. PATENT DOCUMENTS

| | | |
|---|---|---|
| 2012/0267221 A1 | 10/2012 | Gohng et al. |
| 2012/0267222 A1 | 10/2012 | Gohng et al. |
| 2012/0296528 A1 | 11/2012 | Wellhoefer et al. |
| 2012/0299856 A1 | 11/2012 | Hasui |
| 2013/0016053 A1 | 1/2013 | Jung et al. |
| 2013/0063380 A1 | 3/2013 | Wang et al. |
| 2013/0063389 A1 | 3/2013 | Moore |
| 2013/0093679 A1 | 4/2013 | Dickinson et al. |
| 2013/0096849 A1 | 4/2013 | Campbell et al. |
| 2013/0106691 A1 | 5/2013 | Rank |
| 2013/0113715 A1 | 5/2013 | Grant et al. |
| 2013/0113717 A1 | 5/2013 | Van Eerd et al. |
| 2013/0122857 A1 | 5/2013 | Karaogu et al. |
| 2013/0128587 A1 | 5/2013 | Lisseman et al. |
| 2013/0141396 A1 | 6/2013 | Lynn et al. |
| 2013/0147284 A1 | 6/2013 | Chun |
| 2013/0154938 A1 | 6/2013 | Arthur et al. |
| 2013/0181931 A1 | 7/2013 | Kenta |
| 2013/0218488 A1* | 8/2013 | Grandemange ........... G01L 1/20 702/41 |
| 2013/0222287 A1 | 8/2013 | Bae et al. |
| 2013/0222310 A1 | 8/2013 | Birnbaum et al. |
| 2013/0228023 A1 | 9/2013 | Drasnin et al. |
| 2013/0250213 A1 | 9/2013 | Tomomasa |
| 2013/0250502 A1 | 9/2013 | Tossavainen |
| 2013/0250613 A1 | 9/2013 | Kamada |
| 2013/0257776 A1 | 10/2013 | Tissot |
| 2013/0265273 A1* | 10/2013 | Marsden ............... G06F 3/0416 345/174 |
| 2013/0307788 A1 | 11/2013 | Rao et al. |
| 2013/0342337 A1 | 12/2013 | Kiefer et al. |
| 2014/0071060 A1* | 3/2014 | Santos-Gomez ..... G06F 3/0488 345/173 |
| 2014/0092025 A1 | 4/2014 | Pala et al. |
| 2014/0114624 A1 | 4/2014 | Buchanan et al. |
| 2014/0191973 A1 | 7/2014 | Zellers |
| 2014/0267076 A1 | 9/2014 | Birnbaum et al. |
| 2014/0267113 A1 | 9/2014 | Lisseman et al. |
| 2014/0267114 A1 | 9/2014 | Lisseman et al. |
| 2014/0347176 A1 | 11/2014 | Modarres et al. |
| 2015/0009164 A1* | 1/2015 | Shinozaki ............... G06F 3/016 345/173 |
| 2015/0009168 A1 | 1/2015 | Olien et al. |
| 2015/0046825 A1 | 2/2015 | Li |
| 2015/0097794 A1 | 4/2015 | Lisseman |
| 2015/0116205 A1 | 4/2015 | Westerman |
| 2015/0212571 A1* | 7/2015 | Kitada ............... H04M 1/72519 345/174 |
| 2015/0309576 A1 | 10/2015 | Tissot |
| 2016/0109949 A1 | 4/2016 | Park |
| 2016/0216764 A1 | 7/2016 | Morrell |
| 2017/0075424 A1 | 3/2017 | Bernstein |

FOREIGN PATENT DOCUMENTS

| | | |
|---|---|---|
| JP | 2000-71809 A | 3/2000 |
| JP | 2005-175815 | 6/2005 |
| JP | 2006-150865 A | 6/2006 |
| JP | 2008-123429 A | 5/2008 |
| JP | 2008-181709 | 8/2008 |
| JP | 2008-299866 A | 12/2008 |
| JP | 2011-3188 A | 1/2011 |
| JP | 2012-73785 A | 4/2012 |
| JP | 2012-150833 A1 | 8/2012 |
| JP | 2012-155628 A | 8/2012 |
| JP | 2012176640 | 9/2012 |
| JP | 2013-513865 A | 4/2013 |
| JP | 2013-182528 A | 9/2013 |
| KR | 1020060047110 | 5/2006 |
| KR | 1020100129424 | 12/2010 |
| WO | 2001088935 | 8/2008 |
| WO | 2011008292 A1 | 1/2011 |
| WO | 2012/052635 A1 | 4/2012 |
| WO | 2013082293 A1 | 6/2013 |
| WO | 2014194192 | 12/2014 |
| WO | 2015054354 | 4/2015 |
| WO | 2015054362 | 4/2015 |
| WO | 2015054364 | 4/2015 |
| WO | 2015054369 | 4/2015 |
| WO | 2015054373 | 4/2015 |

OTHER PUBLICATIONS

International Search Report and Written Opinion issued in related International Application No. PCT/US2014/059673 dated Jan. 9, 2015.

International Search Report and Written Opinion issued in related International Application No. PCT/2014/059669 dated Jan. 23, 2015.

International Search Report and Written Opinion issued in related International Application No. PCT/US2014/059657 dated Feb. 16, 2015.

International Search Report and Written Opinion issued in related International Application No. PCT/US2014/059639 dated Feb. 24, 2015.

International Search Report and Written Opinion issued in related International Application No. PCT/US2014/040224 dated Sep. 24, 2014.

Office Action dated Sep. 30, 2015 in U.S. Appl. No. 14/509,493, filed Oct. 8, 2014.

Co-pending U.S. Appl. No. 14/509,598, filed Oct. 8, 2014, and its file history.

Co-pending U.S. Appl. No. 14/509,493, filed Oct. 8, 2014, and its file history.

Office Action dated Jun. 16, 2016, received in connection with U.S. Appl. No. 14/509,493.

Co-pending U.S. Appl. No. 14/509,462, filed Oct. 8, 2014, and its file history.

Office Action dated Jun. 14, 2016, received in connection with U.S. Appl. No. 14/509,462.

Co-pending U.S. Appl. No. 14/509,560, filed Oct. 8, 2014, and its file history.

Co-pending U.S. Appl. No. 14/509,535, filed Oct. 8, 2014, and its file history.

Office Action dated Feb. 11, 2016, received in connection with U.S. Appl. No. 14/509,535.

Co-pending U.S. Appl. No. 14/291,845, filed May 30, 2014, and its file history.

Office Action dated Feb. 24, 2016, received in connection with U.S. Appl. No. 14/291,845.

Office Action dated Sep. 24, 2015, received in connection with U.S. Appl. No. 14/291,845.

International Preliminary Report on Patentability and Written Opinion, dated Apr. 12, 2016, received in connection with International Patent Application No. PCT/US2014/059639.

International Preliminary Report on Patentability and Written Opinion, dated Apr. 12, 2016, received in connection with International Patent Application No. PCT/US2014/059652.

International Preliminary Report on Patentability and Written Opinion, dated Apr. 12, 2016, received in connection with International Patent Application No. PCT/US2014/059657.

International Preliminary Report on Patentability and Written Opinion, dated Apr. 12, 2016, received in connection with International Patent Application No. PCT/US2014/059669.

International Preliminary Report on Patentability and Written Opinion, dated Apr. 12, 2016, received in connection with International Patent Application No. PCT/US2014/059673.

International Preliminary Report on Patentability and Written Opinion, dated Dec. 10, 2015, received in connection with International Patent Application No. PCT/US2014/040224.

Office action issued in co-pending U.S. Appl. No. 14/509,462, dated Jun. 9, 2017.

Office Action issued in co-pending U.S. Appl. No. 14/509,462, dated Nov. 24, 2017.

Office Action issued in co-pending U.S. Appl. No. 15/230,786, dated Aug. 24, 2017.

(56) References Cited

OTHER PUBLICATIONS

Office Action issued in co-pending U.S. Appl. No. 14/291,845, dated Aug. 24, 2017.
Notice of Allowance issued in co-pending U.S. Appl. No. 14/509,493, dated Oct. 10, 2017.
Office Action received in connection with JP Patent Application No. 2011-075258. (English Translation attached) dated Nov. 4, 2014.
Office Action in U.S. Appl. No. 13/076,226, now U.S. Pat. No. 9,007,190 dated Apr. 14, 2015, dated Mar. 11, 2013.
Office Action in U.S. Appl. No. 13/076,226, now U.S. Pat. No. 9,007,190 dated Apr. 14, 2015, dated Feb. 13, 2014.
Office Action in U.S. Appl. No. 13/076,226, now U.S. Pat. No. 9,007,190 dated Apr. 14, 2015, dated Sep. 11, 2014.
Office Action issued in U.S. Appl. No. 14/509,560, dated Feb. 10, 2017.
Office Action issued in U.S. Appl. No. 14/291,845, dated Feb. 3, 2017.
Office Action issued in U.S. Appl. No. 14/509,598, dated Jan. 6, 2017.
Office Action issued in U.S. Appl. No. 13/863,363, dated Nov. 10, 2015.
Office Action issued in U.S. Appl. No. 14/211,475, dated Dec. 17, 2015.
Office Action issued in U.S. Appl. No. 14/211,665, dated Dec. 15, 2015.
Office Action issued in U.S. Appl. No. 14/509,462, dated Dec. 28, 2016.
Office Action issued in U.S. Appl. No. 14/509,462, dated Jun. 14, 2016.
Office Action issued in U.S. Appl. No. 14/509,493, dated Dec. 28, 2016.
Office Action issued in U.S. Appl. No. 14/509,493, dated Jun. 16, 2016.
Office Action issued in U.S. Appl. No. 14/509,535, dated Feb. 11, 2016.
Office Action issued in U.S. Appl. No. 14/291,845, dated Sep. 24, 2015.
Office Action issued in U.S. Appl. No. 14/291,845, dated Feb. 24, 2016.
International Preliminary Report on Patentability, dated Dec. 10, 2015, received in connection with International Application No. PCT/US2014/040224.
International Preliminary Report on Patentability dated Apr. 12, 2016, received in connection with International Patent Application No. PCT/US2014/059639.
International Preliminary Report on Patentability dated Apr. 12, 2016, received in connection with International Patent Application No. PCT/US2014/059652.
International Preliminary Report on Patentability dated Apr. 12, 2016, received in connection with International Patent Application No. PCT/US2014/059657.
International Preliminary Report on Patentability dated Apr. 12, 2016, received in connection with International Patent Application No. PCT/US2014/059669.
International Preliminary Report on Patentability dated Apr. 12, 2016, received in connection with International Patent Application No. PCT/US2014/059673.
International Preliminary Report on Patentability for International Patent Application No. PCT/US2013/030417, dated Oct. 23, 2014.
International Search Report and Written Opinion for International Patent Application No. PCT/US2013/030417, dated Jun. 21, 2013.
Office Action in U.S. Appl. No. 15/230,786 dated Feb. 7, 2017.
Non-Final Office Action dated Jan. 6, 2017, in co-pending related U.S. Appl. No. 14/509,598.
Notice of Allowance issued in co-pending U.S. Appl. No. 14/509,462, dated Feb. 22, 2018.
Office Action dated Feb. 26, 2018, received in connection with Chinese Application No. 201480030786. (English Translation attached).
Notice of Allowance issued in U.S. Appl. No. 14/291,845, dated Apr. 26, 2018.
Office Action issued in Chinese Application No. 201480055487.1, dated Apr. 27, 2018.
Office Action issued in U.S. Appl. No. 14/509,598, dated May 17, 2018.
Supplemental Notice of Allowance issued in U.S. Appl. No. 14/509,462, dated May 29, 2018.
Office Action issued for Japanese Application No. 2016-517039, dated Jun. 26, 2018.
Office Action issued for U.S. Appl. No. 15/867,226, dated Jun. 29, 2018.
Office Action issued for Japanese Application No. 2016-515524, dated Jul. 24, 2018.

* cited by examiner

FORCE SENSOR WITH HAPTIC FEEDBACK

CROSS-REFERENCE TO RELATED APPLICATION

This application claims the benefit of U.S. Provisional Application No. 61/888,322, filed Oct. 8, 2013, and U.S. Provisional Application No. 61/891,231, filed Oct. 15, 2013, each of which is incorporated herein by reference in its entirety.

TECHNICAL FIELD

The present disclosure relates generally to the field of human-machine interfaces in vehicles, and more particularly, to touch-sensitive, multi-function interfaces that utilize haptic feedback responses to reduce driver distraction.

BACKGROUND

Conventional control systems in vehicles typically present operators with a combination of mechanical, single-function controls such as switches, buttons, levers, knobs, dials, etc. The operator interacts with these control systems by manipulating the controls to execute various control functions. As the number of controllable features increase, switch panels can easily become cluttered with numerous switches, buttons, levers, knobs and dials.

In an effort to reduce the amount of clutter in control panels, while keeping up with consumer demand requiring greater switching functionality, some control systems have implemented the use of tactile feedback responses to notify a user that a switch is activated. Yet these tactile feedback responses merely simulate the depression of a binary mechanical switch and this simulation does not inform the user which multifunction switch has been activated. Haptic feedback responses currently lack adequate familiarity for users in a multifunction switching environment.

SUMMARY

According to one aspect, the present disclosure may be directed to a method for setting threshold values based on an amount and also selecting a haptic feedback response that may be based at least on the amount. For example, a method may include determining a touch value based on a touch applied to a touch-sensitive sensor. The method may additionally comprise determining an amount that the touch value exceeds a first threshold value. The method may additionally comprise setting a second threshold value based, at least in part on the amount. The method may additionally comprise selecting a haptic feedback response. The method may additionally comprise generating an output signal that causes a haptic actuator to provide the haptic feedback response.

According to one aspect, the present disclosure may be directed to a method for setting threshold values based on an elapsed time amount and also selecting a haptic feedback response that may be based on the elapsed time amount. For example, the method may comprise determining a touch value based on a touch applied to a touch-sensitive sensor. The method may additionally comprise determining an elapsed time amount that the touch value exceeds a first threshold value. The method may additionally comprise setting a second threshold value based, at least in part on the elapsed time. The method may additionally comprise selecting a haptic feedback response that may be based, at least in part on the elapsed time. The method may additionally include generating an output signal that causes a haptic actuator to provide the haptic feedback response.

In accordance with another aspect, the present disclosure may be directed to an electronic device for setting threshold values based on an amount and selecting a haptic feedback response that is based on the amount. The electronic device may include a touch-sensitive sensor. The electronic device may additionally include memory. The electronic device may include a processing unit that may be in communication with a memory and a touch sensitive sensor. The processing unit of the electronic device may be configured to determine a touch value based on a touch applied to the touch-sensitive sensor. Additionally, the processing unit of the electronic device may be configured to determine an amount that the touch value exceeds a first threshold value. The processing unit may be further configured to set a second threshold value based, at least in part on the amount. The processing unit of the electronic device may be further configured to select a haptic feedback response, based at least in part, on the amount and may be further configured to generate an output signal indicative of the haptic feedback response.

BRIEF DESCRIPTION OF THE DRAWINGS

Like reference symbols in the various drawings indicate like elements.

DETAILED DESCRIPTION

Implementations of the present disclosure now will be described more fully hereinafter. Indeed, these implementations can be embodied in many different forms and should not be construed as limited to the implementations set forth herein; rather, these implementations are provided so that this disclosure will satisfy applicable legal requirements. Unless defined otherwise, all technical and scientific terms used herein have the same meaning as commonly understood by one of ordinary skill in the art. Methods and systems similar or equivalent to those described herein can be used in the practice or testing of the present disclosure. As used in the specification, and in the appended claims, the singular forms "a", "an", "the", include plural referents unless the context clearly dictates otherwise. The term "comprising" and variations thereof as used herein is used synonymously with the term "including" and variations thereof and are open, non-limiting terms.

Figure 1:
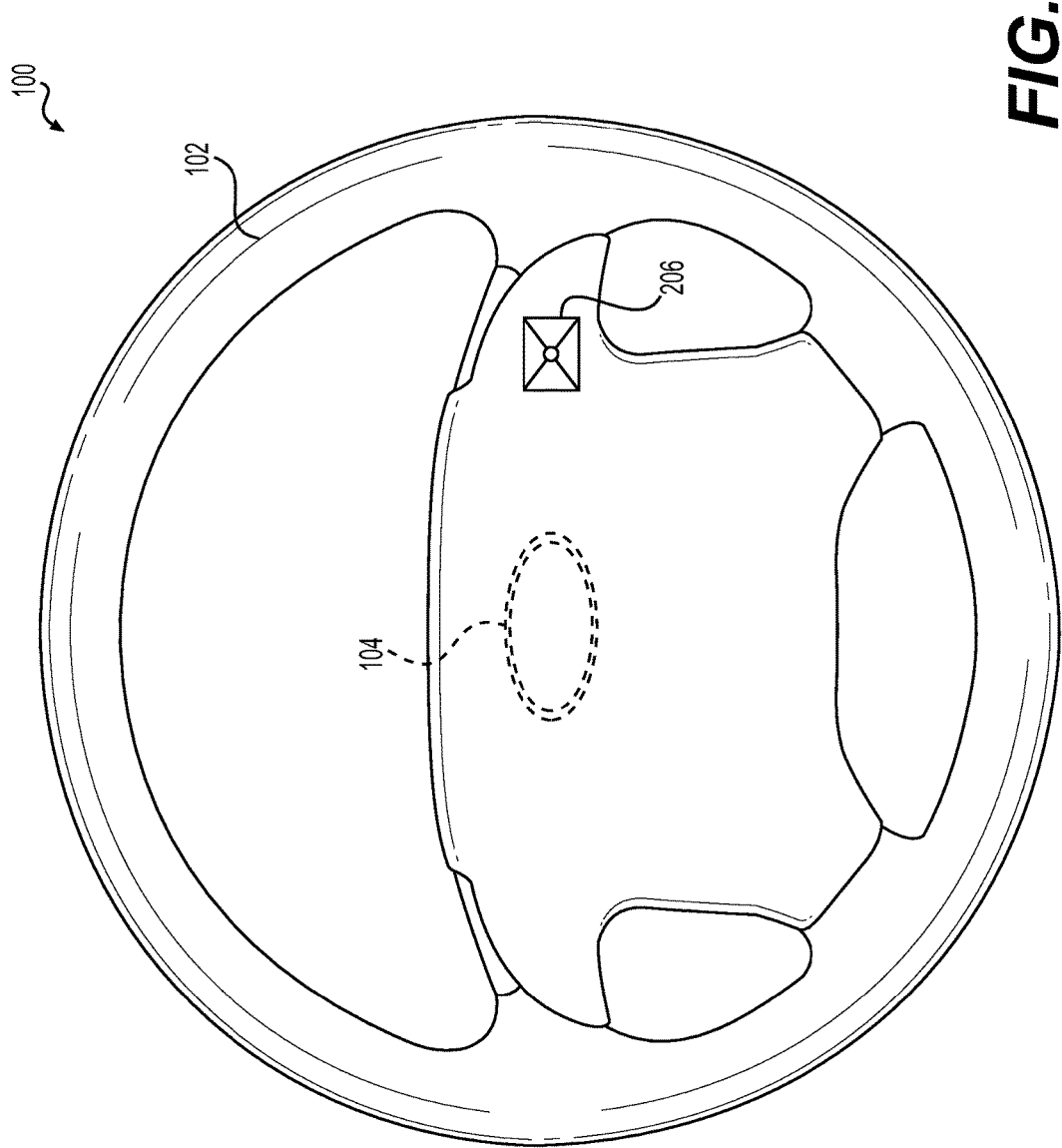
FIG. 1 illustrates a plan view of an exemplary steering apparatus implementing a touch-based human-machine interface for vehicle control panels in accordance with the present disclosure.

FIG. 1 illustrates a plan view of an exemplary steering apparatus implementing a touch-based human-machine interface for vehicle control panels in accordance with the present disclosure. An example steering apparatus 100 can have a steering grip 102. A steering grip 102 can be shaped in such a way to facilitate a driver's control of a vehicle when holding the steering grip 102. For example, the steering grip 102 can include an annular ring shape with an outer contour that is essentially circular in shape. In an alternate implementation, the steering grip 102 can define any suitable shape including, for example, circular, elliptical, square, rectangular, or any other regular or irregular shape. In an exemplary implementation, the steering grip 102 can include a single continuous grip portion or any number of unique grip sections. Additionally the steering grip 102 can be mounted on a fixed component 104 such that it can be rotationally moved about a steering axis. An exemplary fixed component 104 can include, for example, a steering column, which receives a steering spindle that extends along the steering column and serves to transmit the rotational movement of the steering grip 102 to the wheels of the motor vehicle. Rotational movement of the steering grip 102 may be transmitted to the wheels by mechanical and/or electrical means. In an exemplary implementation, the steering apparatus 100 can also include a touch-sensitive sensor 206, wherein the touch-sensitive sensor 206 is operably coupled to the steering grip 102.

Coupling a touch-sensitive sensor 206 to the steering grip 102 of a steering apparatus 100, provides a driver with a human-machine interface that can be configured to detect a touch provided by a user, determine if a switch function should be activated, and then provide the user with a haptic feedback response.

A touch-sensitive sensor 206 can be any sensor configured to change at least one electrical property in response to a touch applied to the sensor 206. A touch, also known as a touch event, can be for example a physical contact that occurs when a driver in a vehicle uses their hand (gloved or ungloved) to apply a force to the touch-sensitive sensor 206. A touch-sensitive sensor 206, can be any suitable tactile sensor including, a mechanical sensor, a resistive sensor, a capacitive sensor, a magnetic sensor, an optical fiber sensor, a piezoelectric sensor, a silicon sensor, and/or a temperature sensor. The touch-sensitive sensor 206 can include an array of touch-sensing units, wherein each touch-sensing unit includes conductors, electrodes and a touch-sensitive surface. In accordance with the present disclosure, the touch-sensitive surface can embody any touch-sensitive deformable member that can be induced to vibrate by a touch sensitive system described in detail below.

Figure 2:
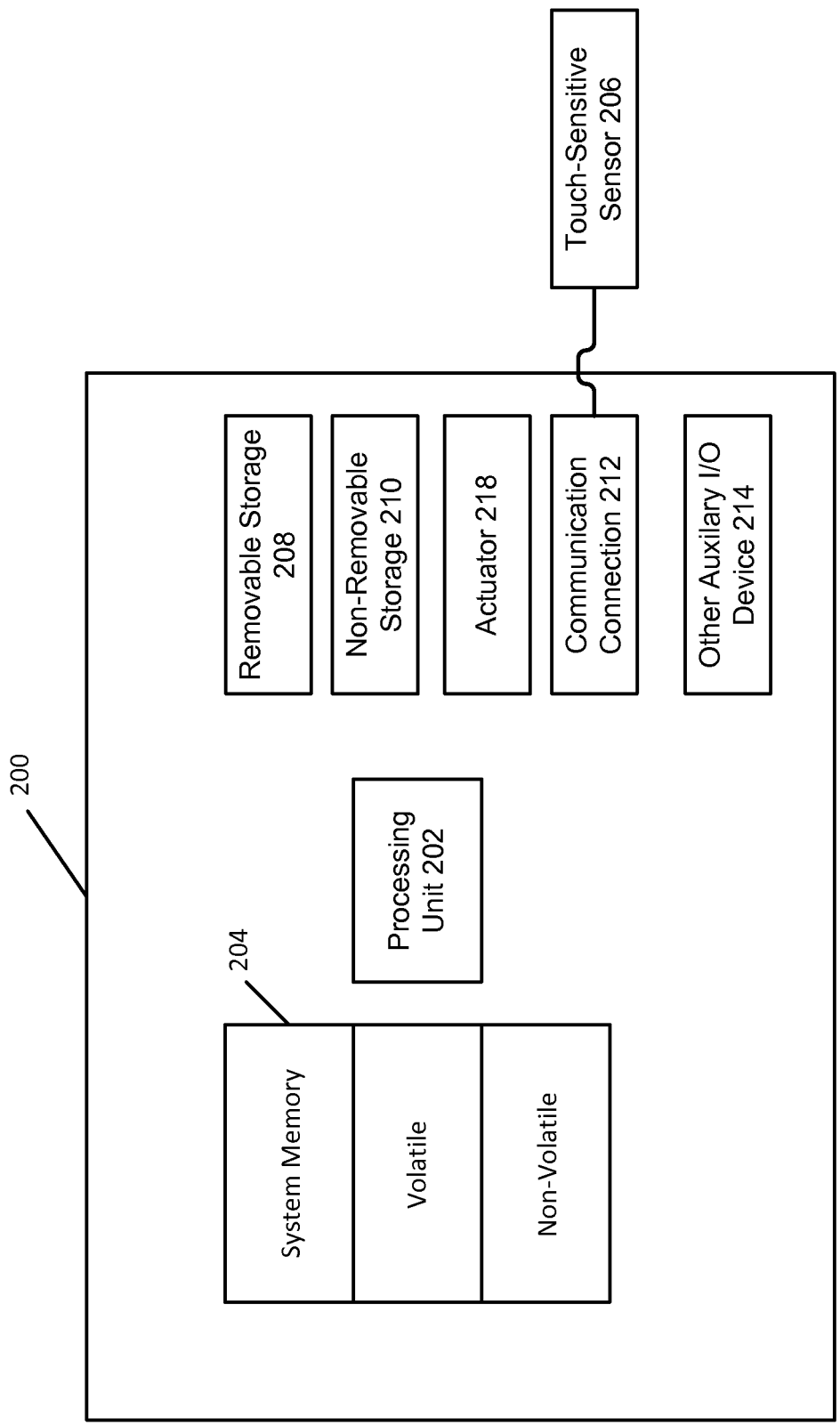
FIG. 2 illustrates an example touch-sensitive system communicatively and/or electrically coupled to a touch-sensitive sensor, in which example processes and methods consistent with the present disclosure can be implemented.

FIG. 2 illustrates an example touch-sensitive system 200 communicatively and/or electrically coupled to a touch-sensitive sensor 206, in which example processes and methods consistent with the present disclosure can be implemented. An example touch-sensitive system 200 can include an actuator 218, a variety of computer readable media, and a processing unit 202, all discussed in detail below. Additionally, a touch-sensitive system 200 can include an auxiliary I/O device 214 such as a keyboard, a mouse, a pen, a voice input device, a display, a speaker, or a printer. A touch-sensitive system 200 can also include a communication connection 212 that can facilitate communication between components of the touch-sensitive system 200. A communication 212 can also be configured to facilitate communication between the touch-sensitive system 200 and the touch-sensitive sensor 206.

An actuator 218 can include or embody any suitable device that can provide a user with a haptic feedback response. Suitable actuators 218 can include an electric motor, a pneumatic actuator, a hydraulic piston, a relay, a comb drive, a piezoelectric actuator, a thermal bimorph, a digital micromirror, an electroactive polymer and a speaker actuator. A speaker actuator can include for example, a conical surface operatively coupled to a deformable member, where the conical surface is configured to induce the deformable member to vibrate because of a sound wave transmitted by the conical surface. A deformable member can, for example, embody a touch-sensitive surface of a touch-sensitive interface 206. Additionally, a deformable member can be any suitable surface or plate that can deform to provide a user with a haptic feedback response.

Haptic feedback responses can include any of a number of stimuli that can be perceived through touch or other non-visual sensory means, such as, for example, mechanical vibrations, changes in surface features (e.g., temperature) or textures, changes in surface tension, electric pulses, or any other types of stimuli that can be perceived through non-visual, touch-based senses. Some examples of haptic feedback responses in accordance with the present disclosure are discussed in more detail in the discussion of FIGS. 8B, 10A-B, and 11.

As stated above, a touch-sensitive system 200 can include a variety of computer readable media such as system memory (volatile and non-volatile) 204, removable storage 208, and/or non-removable storage 210. Further examples of computer readable media can include RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

A touch-sensitive system 200 can include a processing unit 202 that can include or embody any suitable device for processing, moving, and/or manipulating data associated with touch-sensitive system 200. The processing unit 202 can be, for example, a standard programmable processor communicatively coupled to memory 204, a touch-sensitive sensor 206 and a actuator 218. A processing unit 202 can be configured to perform arithmetic and logic operations necessary for the operation of the touch-sensitive system 200 as described in detail below.

A processing unit 202 can be configured to determine touch values, wherein the touch values can be used by the processing unit 202 to performing arithmetic and logical functions necessary for the operation of touch-sensitive system 200. Touch values can be based on the touch applied to a touch-sensitive sensor 206. For example, a touch value can embody a value corresponding to a characteristic or attribute of a touch. A characteristic of a touch can be, for example, a location, a force, and/or a time associated with a touch applied to a touch-sensitive sensor 206.

The location of a touch can be, for example, an area where a touch makes contact with touch-sensitive sensor 206 or a single point where a touch makes contact with the sensor 206. The location of an applied touch can include x and y components. For instance, the location can be a position in either one dimension (e.g., the X- or Y-direction) or two dimensions (e.g., the X- and Y-directions). A location can be determined, for example, by measuring the voltage at the electrodes of the touch-sensitive sensor 206 as a correlation exists between the change in voltage and the resistance of the electrodes.

The magnitude of force of a touch can be, for example, the average magnitude across the area where the touch makes contact with a touch-sensitive sensor 206 or the magnitude at a single point where the touch makes contact with the sensor 206. The magnitude of the force can be determined, for example, by measuring the change in resistance of the touch-sensitive sensor 206 as a correlation exists between the magnitude of a force applied and the resistance of the touch-sensitive sensor 206.

The time associated with the touch applied to a touch-sensitive sensor 206 can be, for example, a timestamp corresponding to the start of a touch, a timestamp corresponding to the end of the touch, or the average of a time stamps corresponding to the start of a touch and the end of the touch. The time associated with the touch applied to a touch-sensitive sensor 206 can be determined for example by using a system clock.

A processing unit 202 can be configured to determine amounts, wherein an amount can be the outcome of a calculation that uses two or more touch values. Amounts can be used in arithmetic and logic operations necessary for the operation of the touch-sensitive system 200. An amount can be, for example, an elapsed time amount, a traversed length amount, an absolute distance amount, or any other amount suitable.

An elapsed time amount can be based on, for example, two discrete time touch values. For instance, an elapsed time amount can be the difference between the timestamp corresponding to the start of a touch and the timestamp corresponding to the end of a touch. In another example, an elapsed time amount can between any timestamps corresponding to a touch.

A traversed length amount can be based on, for example, two discrete location touch values. For instance, a traversed length amount can be the calculated length of the path taken from one discrete location to another discrete location. Similarly, an absolute distance amount can be based on the same two discreet location touch values and can be the calculated linear distance between the two locations.

A processing unit 202 can be further configured to provide a control message for use in controlling various system features. For example, a control message can be used in an automotive environment to control a variety of automotive control functions. In the automotive environment, control messages can be used to control media systems (audio, visual, communication, etc.), driving systems (cruise control), climate control systems (locks, windows, mirrors, etc.). In one example a control message can be specifically used to control increasing or decreasing the volume of a media system. A table of control message may be stored, for example in the system memory 204 and or in the database 216, as shown in FIG. 1.

Additionally, some of the arithmetic and logic operations performed by the processing unit 202 require the use of threshold values. A threshold value can include or embody any touch value or amount as defined above. A user can predetermine a threshold value and processor unit 202 can be further configured to adjust threshold values as detailed below in the description of FIG. 12.

Figure 3:
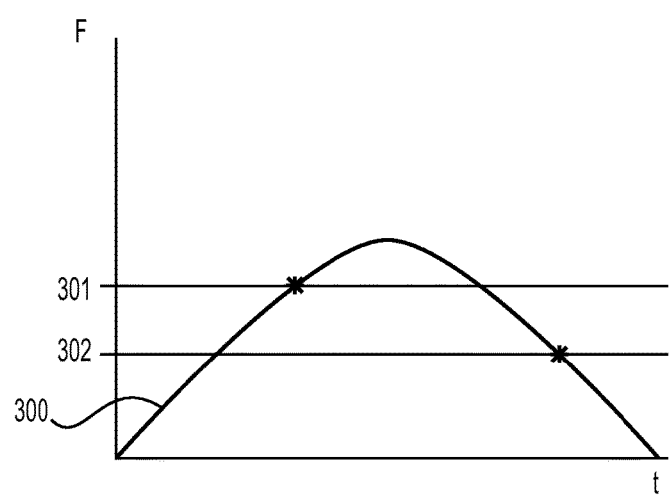
FIG. 3 illustrates a graph representative of an exemplary force touch value curve as determined over a time in accordance with the present disclosure.
Figure 12:
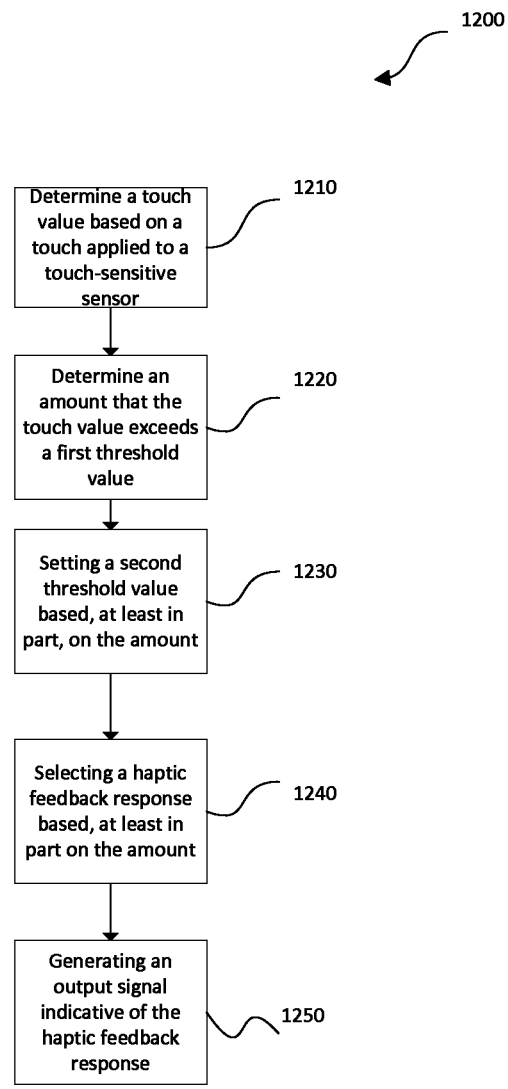
FIG. 12 provides a flowchart illustrating an exemplary process in accordance with the present disclosure.

Referring to FIG. 12, a flowchart 1200 showing an exemplary process in accordance with the present disclosure is shown. An example process can begin by determining a touch value based on a touch applied to a touch-sensitive sensor (Step 1210). In one example, touch values can be determined using a processing unit 202. FIG. 3 illustrates a graph representative of an exemplary force touch value curve 300 as determined over a time in accordance with the present disclosure. In one embodiment, when a user applies a touch to a a touch-sensitive sensor 206, the force touch value associated with the applied touch increases over time until it reaches a peak force value, at which point the force touch value associated with the touch begins to decline until a force touch value can no longer be determined by the processing unit 202. To associate a user's touch with a corresponding intention to control a feature of a vehicle, a vehicle manufacturer may establish one or more force threshold values, such a first threshold force value 301 and second threshold force value 302, each of which can define a threshold level of force that can be required for the system 220 to register the touch event as a valid and intentional input.

In accordance with the present disclosure, a first threshold force value 301 can include or embody a predetermined force threshold that, when exceeded by the determined force touch value, is designed to emulate a "push" event that is analogous to a user's pressing of a mechanical button. A second threshold force value 302 can include or embody a predetermined force threshold, below which the determined force touch value is designed to trigger emulation of a "release" event that is analogous to a user's release of a mechanical button. The first and second threshold force values 301, 302 (representing the "push" and "release" events, respectively) can be defined as different values. Such embodiments may be useful to ensure that a user's interaction with the switch is not prematurely terminated because the user was unable (e.g., because of fatigue) to maintain a high force value over a prolonged period of time.

Figure 4:
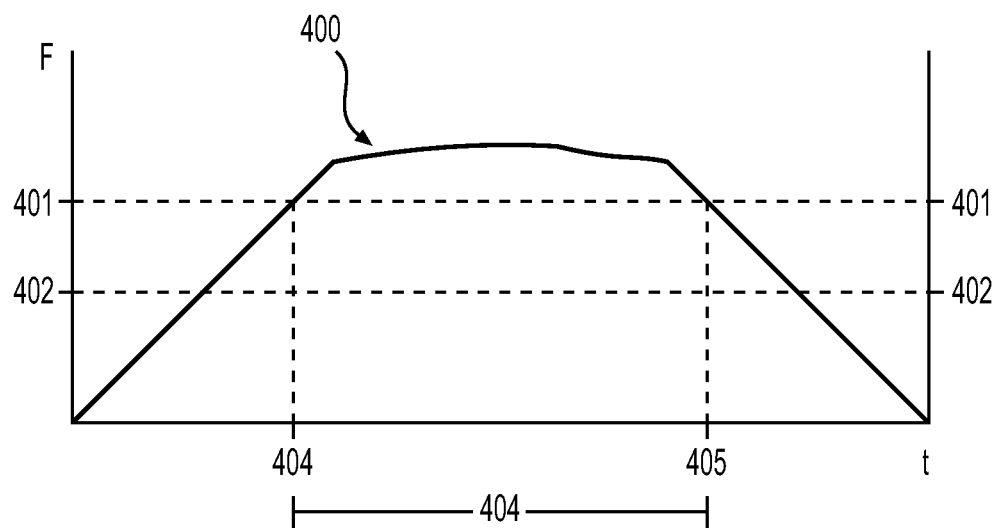
FIG. 4 illustrates a graph representative of an exemplary force touch value curve determined over a time, wherein the graph depicts an amount as an elapsed time amount in accordance with the present disclosure.

After touch values are determined, the exemplary process can include determining an amount that the touch value exceeds a first threshold value (Step 1220). In one example, amounts can be determined using a processing unit 202. As described above, an amount can be, for example, an elapsed time amount, a traversed length amount, an absolute distance amount, or any other amount suitable. FIG. 4 illustrates a graph representative of an exemplary force touch value curve 400 as determined over a time, wherein the graph depicts an amount as an elapsed time amount in accordance with the present disclosure. As stated previously above, an elapsed time amount 403 can be based on, for example, two discrete time touch values. A first discrete time touch value 404 can correspond with the time when the force touch value starts to exceed the first force threshold value 401 as the force touch value associated with the applied touch increases. A second discrete time touch value 405 can correspond with the time when the force touch value stops exceeding the first force threshold value 401 as the force touch value associated with the applied touch decreases. The first and second discrete time touch values 404, 405 can be used to calculate an elapsed time amount 403, wherein the elapsed time amount 403 can be, for example, the span of time where the force touch value exceeds the first threshold force value 401.

Figure 5:
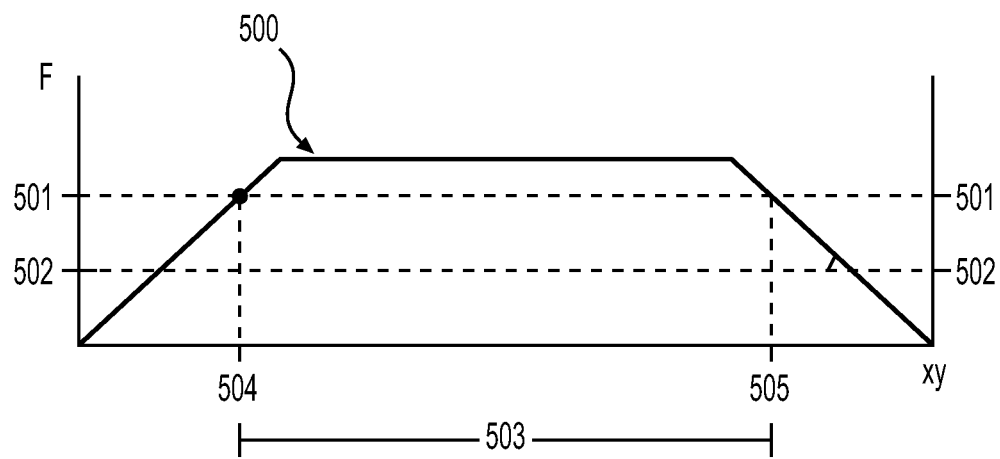
FIG. 5 illustrates a graph representative of an exemplary force touch value curve as determined over a distance, wherein the graph depicts an amount as an absolute distance amount in accordance with the present disclosure.

FIG. 5 illustrates a graph representative of an exemplary force touch value curve 500 as determined over a distance, wherein the graph depicts an amount as an absolute distance amount 503 in accordance with the present disclosure. As stated previously above, an absolute time amount 403 can be based on, for example, two discrete time touch values. A first discrete location touch value 504 can correspond with a location where the force touch value starts to exceed the first force threshold value 501. A second discrete location touch value 505 can correspond with a location where the force touch value stops exceeding the first force threshold value 501. The first and second discrete location touch values 504, 505 can be used to calculate an absolute distance amount 503, wherein the absolute distance amount can be the linear distance between where the force touch value exceeds the first threshold force value 501.

Importantly, however, it is contemplated that although the following steps make reference to an elapsed time amount, any other suitable amount in accordance with the present disclosure can be substituted.

Referring back to flowchart 1200 as shown in FIG. 12, after an amount is determined (Step 1230), an exemplary process can include setting a second threshold value based at least in part on the determined amount (Step 1240). As mentioned previously, a second threshold value (representing a "release" event) can be established in such a way as to ensure that a user's interaction with the switch is not prematurely terminated if the user was unable (e.g., because of fatigue) to maintain a high force value over a prolonged time. For example, if a user provides a touch wherein the determined touch value exceeds a first threshold value for a relatively large elapsed time amount, the processing unit 202 can be configured to set the second force threshold value to a lower value as compared to an instance where the elapsed time amount is relatively short.

Figure 6A:
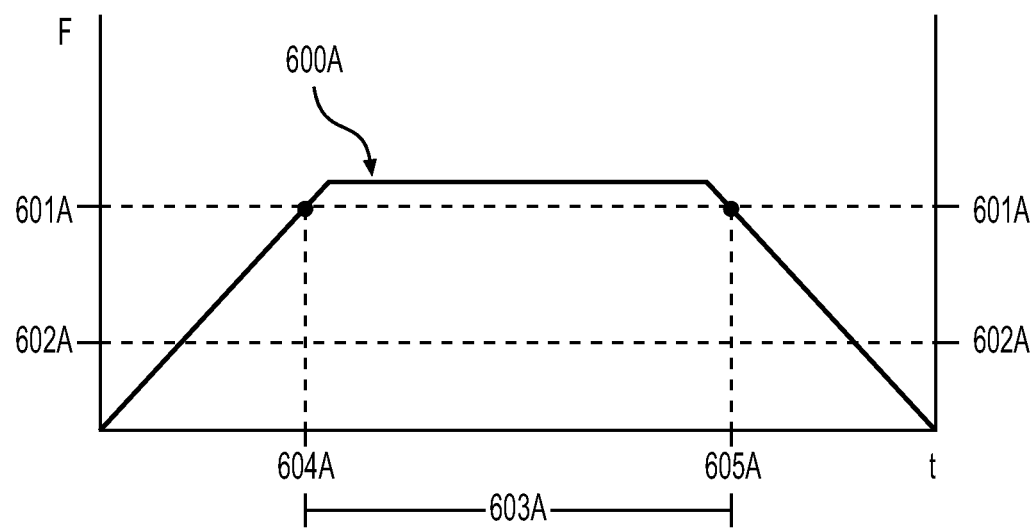
FIG. 6A illustrates a graph representative of an exemplary force touch value curve as determined over a time, wherein the graph depicts a first and a second threshold value in accordance with the present disclosure.
Figure 6B:
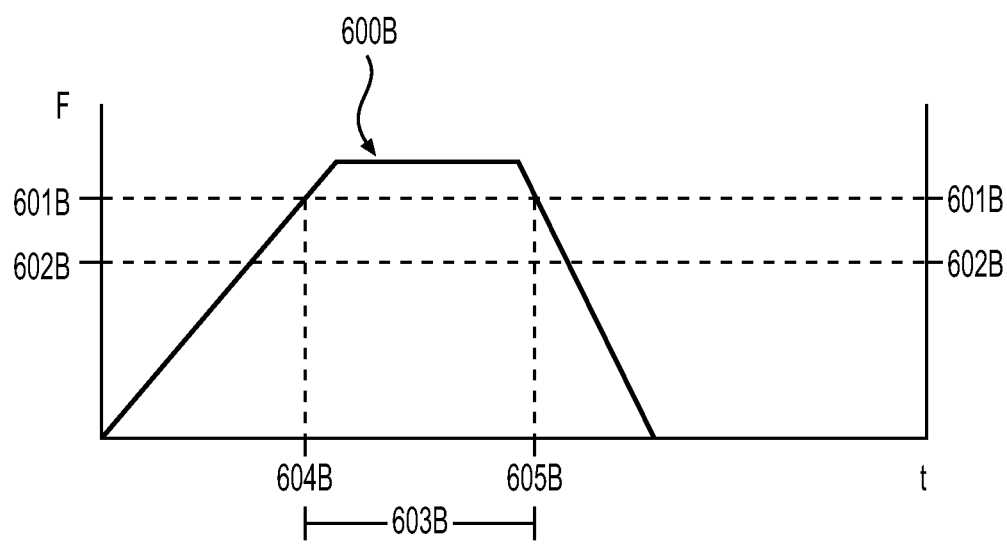
FIG. 6B illustrates a graph representative of an exemplary force touch value curve as determined over a time, wherein the graph depicts a first and a second threshold value in accordance with the present disclosure.

FIGS. 6A-6B illustrates graphs representative of an exemplary force touch value curves 600A, 600B as determined over a time, wherein each graph depicts a first threshold value 601A, 601B and a second threshold value 602A, 602B, in accordance with the present disclosure. FIG. 6A depicts an elapsed time amount 603A residing between a first discrete time touch value 604A and a second discrete time touch value 605A. Similarly, FIG. 6B depicts an elapsed time amount 603B residing between a first discrete time touch value 604B and a second discrete time touch value 605B. The second force threshold value 602A in FIG. 6A is lower compared to the second threshold force value 602B in FIG. 6B while the elapsed time amount 603A in FIG. 6A is larger than the elapsed time amount 603B in FIG. 6B. FIGS. 6A-6B demonstrate exemplary force touch value curves where in, the magnitude of the second threshold value 602A, 602B can be proportional to the length of an elapsed time amount 603A, 603B. Therefore, to ensure that a user's interaction with a switch is not prematurely terminated, the second threshold values 602A, 602B can be established so to that the higher the elapsed time amount (603A compared to 603B) the lower the second force threshold value (602A compared to 602B). Specifically, the second threshold value 602A, 602B can be established such that a difference between the second threshold value 602A, 602B is directly related to the amount 603A, 603B.

In accordance with the present disclosure, setting a second threshold value based at least in part on the amount (Step 1240) can further include determining that the amount exceeds a first threshold amount and then setting the second threshold value based on at least on the determined amount. A first threshold amount can be a predetermined minimum that an amount must exceed before significantly adjusting the second threshold value. Similar to an amount, a first threshold amount can embody a first threshold time amount, a first threshold absolute distance amount, a first threshold traversed length amount and any other suitable threshold amount. Requiring an amount to exceed a first threshold amount before the processing unit 202 adjusts the second threshold value, ensures that the interaction by a user was intended to activate a switch.

Figure 7A:
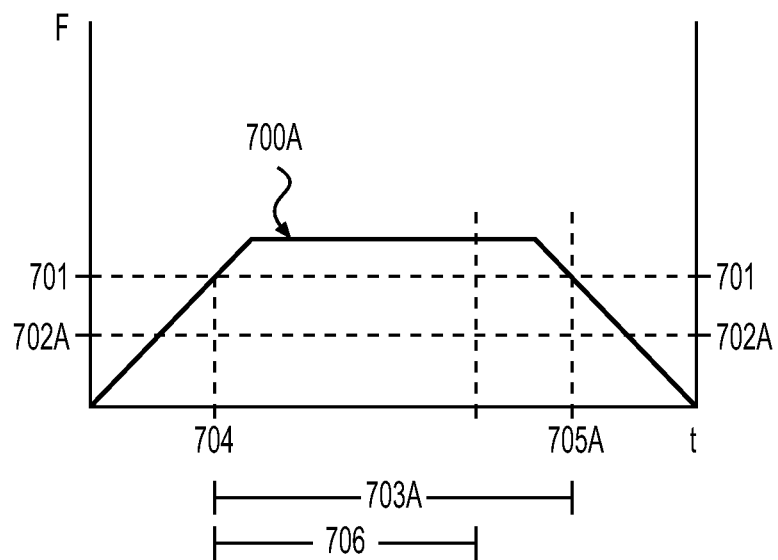
FIG. 7A illustrates a graph representative of an exemplary force touch value curve, wherein the graph depicts an amount exceeding a first threshold amount in accordance with the present disclosure.

FIG. 7A illustrates a graph representative of an exemplary force touch value curve 700A, wherein the graph depicts an amount 703A exceeding a first threshold amount 706 in accordance with the present disclosure. In some embodiments, as seen in in FIG. 7A, the second force threshold value 702A and the first force threshold value 701A is different when the elapsed time amount exceeds the first threshold time amount 706. A processing unit 202 can be configured so that the processing unit 202 establishes a second threshold force value 702A substantially different than the first threshold force value 701A only after an amount 703A exceeds a first threshold amount 706.

Figure 7B:
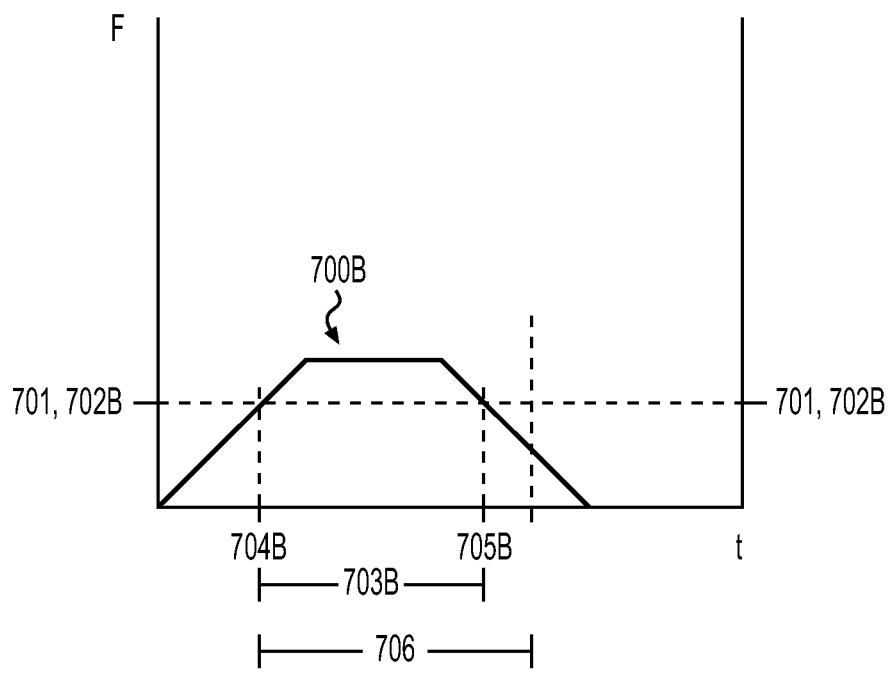
FIG. 7B illustrates a graph representative of an exemplary force touch value curve, wherein the graph depicts an amount 703A failing to exceed a first threshold amount in accordance with the present disclosure.

FIG. 7B illustrates a graph representative of an exemplary force touch value curve 700B, wherein the graph depicts an amount 703B failing to exceed a first threshold amount 706 in accordance with the present disclosure. In some embodiments, as seen in FIG. 7B, the second force threshold value 702B is substantially equivalent to the first force threshold value 701B when the elapsed time amount does not exceed the first threshold time amount 706. A processing unit 202 can be configured so that the processing unit 202 establishes a second threshold force value 702B as substantially equal to the first force threshold value 701B only after an amount 703B fails to exceed a first threshold amount 706.

Figure 8A:
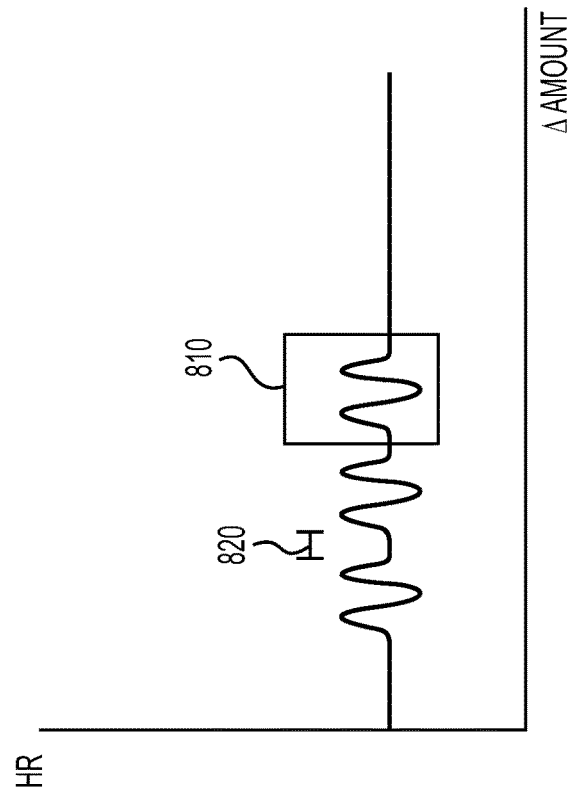
FIG. 8A illustrates a graph representative of an example of a series of haptic feedback responses in accordance with the present disclosure.
Figure 8B:
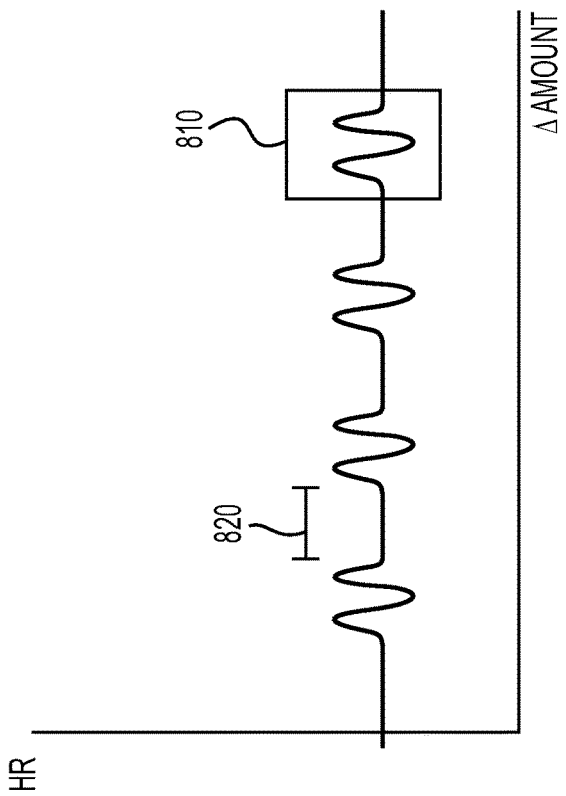
FIG. 8B illustrates a graph representative of an example of a series of haptic feedback responses in accordance with the present disclosure.

Referring back to flowchart 1200 as shown in FIG. 12, an exemplary process can include selecting a haptic feedback response (Step 1250). FIGS. 8A-B illustrate graphs representative of examples of a series of haptic feedback responses in accordance with the present disclosure. Specifically FIG. 8A-B show graphs of a series of haptic feedback responses wherein each haptic feedback response 810 can depend on the change in amount, wherein the amount can be an elapsed time amount. Each tactile feedback response 810 in the series of tactile feedback responses 810 can be the same or different. Each tactile feedback response 810 can embody a waveform; the waveform can embody a sinusoidal wave, a square wave, a triangle wave, a sawtooth wave, a pulse wave or any other suitable periodic or non-periodic wave. FIG. 8A also demonstrates a rest time 820 that can exist between a number of haptic feedback response 810 in a series of haptic feedback responses 810.

Figure 9A:
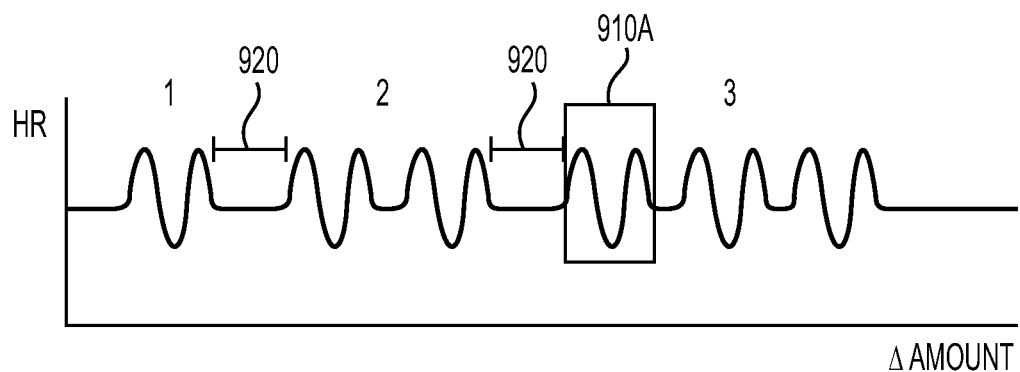
FIG. 9A illustrates a graph representative of an example of a series of haptic feedback responses where the number of a haptic feedback responses between rests vary in accordance with the present disclosure.

FIG. 9A illustrates a graph representative of an example of a series of haptic feedback responses 910A where the number of a haptic feedback responses 910A between rests vary in accordance with the present disclosure. Specifically, FIG. 9A shows an example of a series of haptic feedback responses 910A wherein the number of haptic feedback responses 910A, also known as the frequency, between rests 920 increases as the elapsed time amount increases. In one embodiment, the number of haptic feedback responses 910A between rests 920 can be indicative of a respective control value within a numerical list of control values. For instance, three haptic feedback responses 910A between a set of rests 920, can be indicative of a volume setting with a setting of three. In one embodiment, the frequency of haptic feedback responses 910A between rests 920 in a series of haptic feedback responses 910A can be indicative of increasing a control value over time or decreasing a control value over time.

Figure 9B:
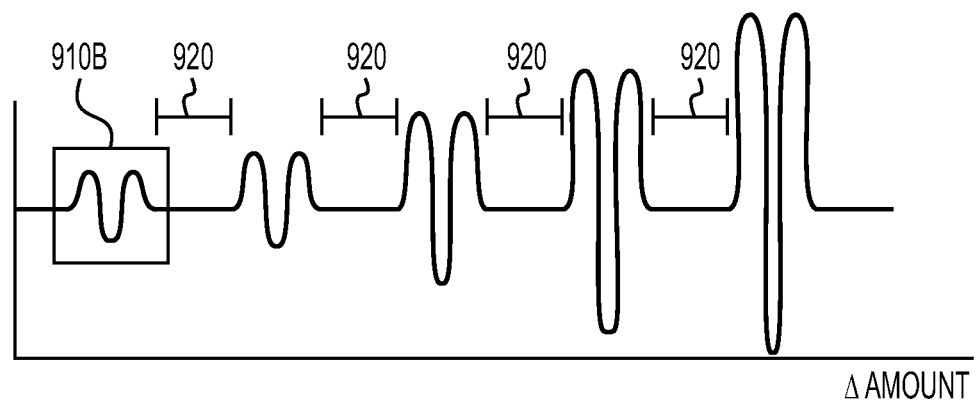
FIG. 9B illustrates a graph representative of an example of a series of haptic feedback responses where the amplitude of each haptic feedback response vary in accordance with the present disclosure.

Similarly, FIG. 9B illustrates a graph representative of an example of a series of haptic feedback responses 910B where the amplitude of each haptic feedback response 910B vary in accordance with the present disclosure. Specifically, FIG. 9B shows an example of a series of haptic feedback responses 910B wherein the amplitude of each haptic feedback response 910B between rests 920 increases as the elapsed time amount increases. In one embodiment, the amplitude of haptic feedback responses 910B between rests 920 can be indicative of a respective control value within a numerical list of control values.

Figure 10:
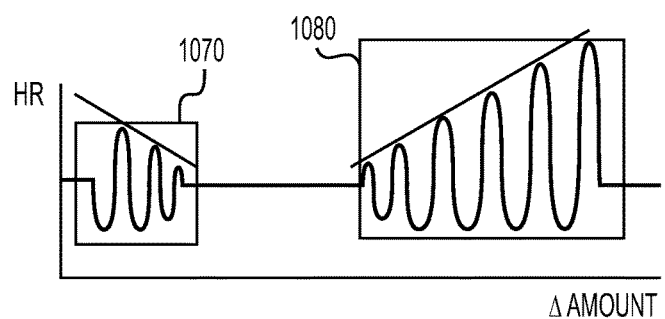
FIG. 10 illustrates a graph representative of an example of a series of haptic feedback responses where the frequency and/or amplitude of each haptic feedback response vary in accordance with the present disclosure.

FIG. 10 illustrates a graph representative of example of a series of haptic feedback responses where the frequency and/or amplitude of each haptic feedback response can be based at least on an amount. Specifically, FIG. 10 illustrates a simulated ramping down and up effect wherein the frequency and/or amplitude of a first haptic feedback response 1070 can decrease as a function of the elapsed time amount and wherein the frequency and/or amplitude of a second haptic feedback response 1080 can increase as a function of the elapsed time amount. In accordance with the present disclosure, a haptic feedback response with varying amplitude and frequency can be indicative of a change of state of a system feature. For instance, upon turning on cruise control in a vehicle, a user may sense a haptic feedback response similar to the second haptic feedback response 1080 and upon turning off the cruise cruise control the a user may sense a haptic feedback response similar to the first haptic feedback response 1070.

Referring back to flowchart 1200 as shown in FIG. 12, after selecting a haptic feedback response (Step 1250), an exemplary process can include generating an output signal indicative of the haptic feedback response (Step 1260). In one embodiment, a processing unit 202 can be further configured to generate the output signal indicative of a selected haptic feedback response 1110. In some embodiments, a processing unit 202 can be further configured to require a minimum amount like a minimum elapsed time amount before generating the output signal.

Figure 11:
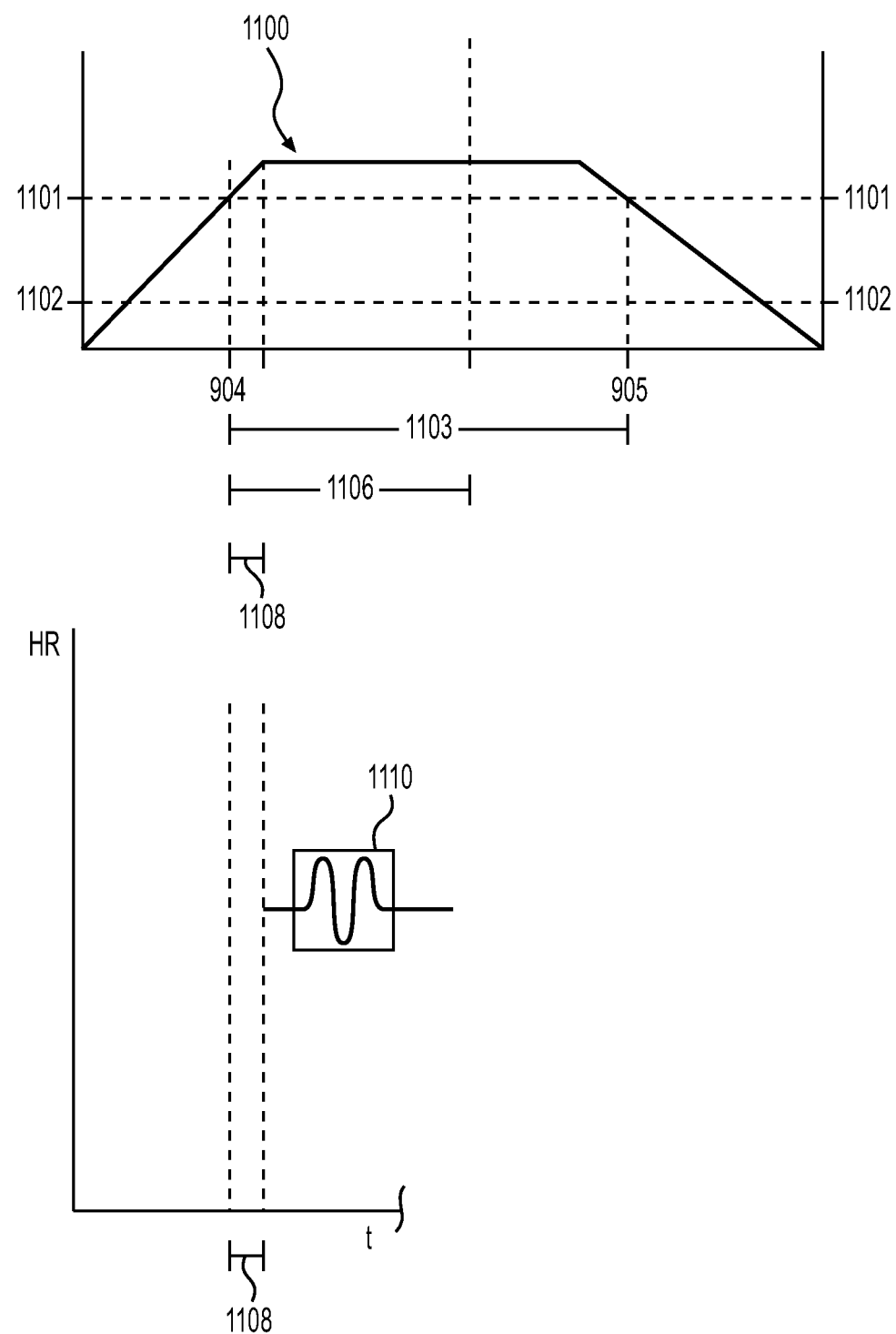
FIG. 11 illustrates a graph representative of an exemplary force touch value curve as determined over a time in accordance with the present disclosure, wherein the graph depicts a haptic feedback response being generated after an amount exceeds a second threshold amount.

FIG. 11 illustrates a graph representative of an exemplary force touch value curve 1100 as determined over a time in accordance with the present disclosure, wherein the graph depicts a haptic feedback response 1110 generated after an amount 1103 exceeds a second threshold amount 1108. In accordance with the present disclosure, a second threshold amount 1108 is a predetermined minimum elapsed time amount 1103 that is needed before a processing unit 202 generates an output signal indicative of a haptic feedback response 1110. The second threshold time amount 1108 can be predetermined, for instance, by a vehicle manufacturer, in such a way as to ensure that a user's unintentional interaction with the touch-sensitive sensor 206 does not prematurely provide a haptic feedback response 1110 when the user does not intend for his/her touch to trigger a switch.

A second threshold elapsed time 1108 the same or different as each provides a threshold for different processing unit 202 functions. As stated above, the first threshold amount 1106 can be used by a processing unit 202 to decide how a second force threshold value 1102 can be established, while the second threshold amount 1108 can be used by a processing unit 202 to decide if an output signal indicative of a haptic feedback response 1110 should be generated.

It should be understood that the various techniques described herein can be implemented in connection with hardware or software or, where appropriate, with a combination of both. Additionally, aspects of the presently disclosed subject matter may be implemented in a computing environment in or across a plurality of processing units 202 or other computing devices. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Computer-executable instructions, such as program modules, being executed by a computer can be used. Generally, program modules include routines, programs, objects, components, data structures, etc. that performs particular tasks or implement particular abstract data types. Distributed computing environments can be used where tasks are performed by remote processing devices that are linked through a communications network or other data transmission medium. In a distributed computing environment, program modules and other data can be located in both local and remote computer storage media including memory storage devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
   determining a touch value based on a touch applied to a touch-sensitive sensor;
   determining an elapsed time that the touch value initially exceeds a first threshold value, the first threshold value associated with a push event;
   setting a second threshold value of the touch-sensitive sensor based on the elapsed time, the second threshold value associated with a release event;
   selecting a haptic feedback response based on the elapsed time; and
   generating an output signal indicative of the haptic feedback response.

2. The method of claim 1, wherein generating the output signal indicative of the haptic feedback response includes generating a control signal that causes a haptic actuator to provide the haptic feedback response as a mechanical wave with a frequency that is based on the elapsed time.

3. The method of claim 1, wherein generating the output signal indicative of the haptic feedback response includes generating a control signal that causes a haptic actuator to provide the haptic feedback response as a mechanical wave with a amplitude that is based on the elapsed time.

4. The method of claim 1, wherein setting the second threshold value comprises:
   comparing the elapsed time with a threshold time value;
   determining that the elapsed time exceeds the threshold time value; and
   establishing the second threshold value such that a difference between the second threshold value and the first threshold value is directly related to the amount of time that the elapsed time exceeds the threshold time value.

5. The method of claim 1, wherein setting the second threshold value comprises:
   comparing the elapsed time with a threshold time value;
   determining that the elapsed time does not exceed the threshold time value; and
   establishing the second threshold value as substantially equal to the first threshold value.

6. The method of claim 1, further comprising comparing the elapsed time with a threshold time value, wherein generating the output signal indicative of the haptic feedback response includes generating the output signal responsive to a determination that the elapsed time exceeds the threshold time value.

7. The method of claim 1, wherein the output signal includes a signal for controlling actuation of an acoustic actuator.

8. A method comprising:
   determining a touch value based on a touch applied to a touch-sensitive sensor;
   determining an amount that the touch value initially exceeds a first threshold value, the first threshold value being associated with a push event;
   setting a second threshold value of the touch-sensitive sensor based on the amount, the second threshold value associated with a release event;
   selecting a haptic feedback response based on the amount;
   generating an output signal indicative of the haptic feedback response.

9. The method of claim 8, wherein the touch value and the first threshold value are force values and wherein determining the touch value includes measuring a force applied to the touch-sensitive interface.

10. The method of claim 9, further comprising comparing the amount with a threshold amount value, wherein the amount and the threshold amount value are time values and wherein determining the amount includes measuring an elapsed time that the touch value exceeds the first threshold value.

11. The method of claim 8, wherein the touch value includes a force component and a position component and the first threshold value includes a force value.

12. The method of claim 11, further comprising comparing the amount with a threshold amount value, wherein the amount and the threshold amount value are distance values and wherein determining the amount includes determining a distance associated with a change in position of the touch value applied to the touch-sensitive sensor.

13. The method of claim 8, wherein generating the output signal indicative of the haptic feedback response includes generating a control signal that causes a haptic actuator to provide the haptic feedback response as a mechanical wave with a frequency that is based on the amount.

14. The method of claim 8, wherein generating the output signal indicative of the haptic feedback response includes generating a control signal that causes a haptic actuator to provide the haptic feedback response as a mechanical wave with a amplitude that is based on the amount.

15. The method of claim 8, further comprising comparing the amount with a threshold amount value, wherein setting the second threshold value comprises:
   determining that the amount exceeds the threshold amount value; and
   establishing the second threshold value such that a difference between the second threshold value and the first threshold value is directly related to a part of the amount that exceeds the threshold amount value.

16. The method of claim 8, further comprising comparing the amount with a threshold amount value, wherein setting the second threshold value comprises:
   determining that the amount does not exceed the threshold amount value; and
   establishing the second threshold value as substantially equal to the first threshold value.

17. The method of claim 8, further comprising comparing the amount with a threshold amount value, wherein generating the output signal indicative of the haptic feedback response includes generating the output signal responsive to a determination that the amount exceeds the threshold amount value.

18. An electronic device comprising:
   a touch-sensitive interface configured to detect a touch on a surface of the touch-sensitive interface;
   a memory; and
   a processing unit in communication with the memory and the touch-sensitive interface, the processing unit configured to:
      determine a touch value based on the touch applied to the touch-sensitive sensor;
      determine an amount that the touch value initially exceeds a first threshold value, the first threshold value being associated with a push event;
      set a second threshold value of the touch-sensitive interface based on the amount the second threshold value associated with a release event;
      select a haptic feedback response based on the amount; and
      generate an output signal indicative of the haptic feedback response.

19. The electronic device of claim 18, further comprising an actuator configured to provide the haptic feedback response as a mechanical wave with a frequency that is based on the amount.

20. The electronic device of claim 18, further comprising an actuator configured to provide the haptic feedback response as a mechanical wave with an amplitude that is based on the amount.

21. The electronic device of claim 18, further comprising comparing the amount with a threshold amount value, wherein setting the second threshold value comprises:
   determining that the amount exceeds the threshold amount value; and
   establishing the second threshold value such that a difference between the second threshold value and the first threshold value is directly related to the amount that exceeds the threshold amount value.

22. The electronic device of claim 18, further comprising comparing the amount with a threshold amount value, wherein setting the second threshold value comprises:
   determining that the amount does not exceed the threshold amount value; and
   establishing the second threshold value as substantially equal to the first threshold value.

23. The electronic device of claim 18, wherein the electronic device is operably coupled to a steering wheel.

\* \* \* \* \*